United States Patent [19]

Ishihara et al.

[11] 4,093,264

[45] June 6, 1978

[54] SPEED CHANGING POSITION REGULATING DEVICE FOR AUTOBICYCLES

[75] Inventors: Takeo Ishihara, Asaka; Hitoshi Yamamoto, Wako; Tsuyoshi Iiga, Kawagoe, all of Japan

[73] Assignee: Honda Giken Kogyo Kabushiki Kaisha, Tokyo, Japan

[21] Appl. No.: 713,829

[22] Filed: Aug. 12, 1976

[30] Foreign Application Priority Data

Aug. 15, 1975 Japan .................... 50-98470

[51] Int. Cl.$^2$ ............................................ B60K 23/00
[52] U.S. Cl. ........................... 280/296; 180/30; 180/82 A; 280/293
[58] Field of Search ............ 74/477; 192/4 R; 180/30, 33 R, 33 B, 82 R, 82 A, 103 R; 280/293, 295, 296, 301

[56] References Cited

U.S. PATENT DOCUMENTS 3,250,142  5/1966  Schuster ............. 180/103 R X

FOREIGN PATENT DOCUMENTS 437,677  1948  Italy ....................... 280/295

Primary Examiner—Joseph F. Peters, Jr.
Assistant Examiner—Terrance L. Siemens
Attorney, Agent, or Firm—Irving M. Weiner; Pamela S. Austin

[57] ABSTRACT

A speed changing position regulating device for a motorcycle, having a speed changing operating means (60) for a transmission gear for changing over speed changing positions by the operation of a shift pedal (30) operatively connected with the speed changing operating means (60). A link mechanism (40, 50, 80, 110) is operated through connecting means (165, 170) by the rise and fall of a stand (160) so that, when the stand rises, the shift position of the speed changing operating means may be changed over to a neutral position by the link mechanism operated by the connecting means and the speed changing operating means may be held in the neutral position.

7 Claims, 5 Drawing Figures

SPEED CHANGING POSITION REGULATING DEVICE FOR AUTOBICYCLES

The present invention relates to a speed changing position regulating device in a transmission gear for autobicycles or motorcycles.

More particularly, the present invention relates to a speed changing position regulating device adapted particularly to a motorcycle equipped with a fluid type automatic transmission gear, wherein, when the motorcycle is erected by a stand, i.e., is parked or stopped, a speed changing operating member of the transmission gear will be operated as operatively connected with the stand to hold the transmission gear in the neutral position.

BACKGROUND OF THE INVENTION

When a motorcycle is temporarily parked while the engine is running, there will be a fear and danger that the change pedal will be operated by someone so that the motorcycle may start or tumble to cause an accident. Even when the motorcycle is parked while the engine is off, there is a danger that it will be forgotten to change the transmission gear to neutral so that the engine may start and the motorcycle may start running.

Particularly, when a motorcycle equipped with a fluid type automatic transmission gear is parked by its side stand while the engine is running, there is a danger that a driving force will be left in the wheel by the creep torque of the torque converter and the motorcycle will tumble.

Therefore, it is necessary to hold the change pedal in the neutral position. However, in such case, even if only the change pedal is shifted to the neutral position, unless it is regulated, there is a danger that someone will shift it to a low speed or drive position. There is also a danger that the operator will carelessly forget to return the change pedal to the neutral position.

Heretofore, there has been suggested a means of returning the change pedal to the neutral position in accordance with the rise and fall of the side stand or the like. In this kind of conventional device, the change pedal is regulated by the side stand or the like. For example, the side stand and change pedal are connected with each other through levers and links so that, when the stand rises, the change pedal may return to neutral, or the change pedal returned to neutral is regulated by a cam operatively connected with the rise and fall of the side stand.

In the former of such conventional means, that is, in the type in which the change pedal is regulated by the side stand, as the change pedal is regulated but the transmission gear itself is not regulated, the regulation is indirect. Further, as the change pedal is operated by the rise and fall of the side stand through links and levers, there is a danger that the operation of setting the transmission gear in neutral is inaccurate. Further, there is a disadvantage that the levers are so long that the mechanism is complicated, and there is a drawback in that all the mechanism is exposed to impair the appearance of the motorcycle.

In the latter conventional type, that is, the type in which the change pedal is pressed with the cam to regulate the operation of shifting the pedal to low speed position or drive range, the regulation of the transmission gear is also indirect. It is also necessary for the operator to operate the change pedal to set it in neutral. There is a risk that the operator will carelessly forget to operate the pedal.

Thus, the conventional means have various problems.

SUMMARY OF THE INVENTION

The present invention effectively solves such problems of the transmission gear and speed changing position regulating means when a motorcycle is parked.

An object of the present invention is to provide a speed changing position regulating device for motorcycles wherein a speed changing operating member of a transmission gear will be operated directly as operatively connected with the rising operation of such stand as a side stand when the motorcycle is parked, the transmission gear itself will be shifted directly to neutral position when the stand rises and this position will be directly regulated and held by the stand.

Particularly, the present invention provides a speed changing position regulating device for motorcycles wherein a speed changing operating member of a transmission gear, that is, such operating member as a manual shift valve for changing over high and low clutches of a fluid type automatic transmission gear or such operating member as a shift drum of a gear shift type mechanical transmission gear is operated directly by a mechanism or rods and links related with the side stand so as to forcibly return said operating member to the neutral position and hold it.

Therefore, an object of the present invention is to provide a speed changing position regulating device for motorcycles wherein, as different from indirectly regulating the speed changing position through the change pedal with the stand, the setting and holding the speed changing operating member in the neutral position are positive so that the speed changing operation by a third person when the motorcycle is parked may be positively prevented and such accident as the starting and tumbling of the motorcycle while the engine is in operation when the motorcycle is parked may be eliminated.

Another object of the present invention is to provide a speed changing position regulating device wherein a speed changing operating member is directly and forcibly returned to neutral by the rise of the stand so that the operator cannot forget to change the transmission gear to neutral, the transmission gear may be automatically set in neutral by the rise of the stand, and the safety of the motorcycle is increased.

Another object of the present invention is to provide a speed changing position regulating device for motorcycles wherein a speed changing operating member is directly, forcibly and automatically set in neutral position by the rise of the stand so that the return of the speed changing operating member to neutral position and holding it in said position is positive and the reliability is high.

The present invention can be applied to a motorcycle equipped with an automatic transmission gear provided with a fluid torque converter to increase safety when the motorcycle is parked and started. In this kind of transmission gear, a driving force remains in the wheel due to the creep torque of the fluid torque converter, and therefore it is desired to accurately set and hold the transmission gear in neutral when the motorcycle is parked.

According to the present invention, in a motorcycle of such type, a manual shift valve which is a speed changing operating member is directly connected with the stand through rods and links so that, with the rise of the stand, the shift valve is automatically and forcibly operated to return to neutral. Therefore, the high and low clutches of the automatic transmission gear of a fluid torque converter type are forcibly set so that, even if the motorcycle is parked while the engine is running, the transmission gear may be returned to and held in neutral, starting and tumbling accidents may be positively prevented, such accident as the careless starting of the motorcycle when the engine is started may be prevented and the safety of the motorcycle equipped with a fluid torque converter type automatic transmission gear may be increased.

DETAILED DESCRIPTION

The illustrated embodiment represents a motorcycle equipped with a fluid torque converter type automatic transmission gear.

Figure 1:
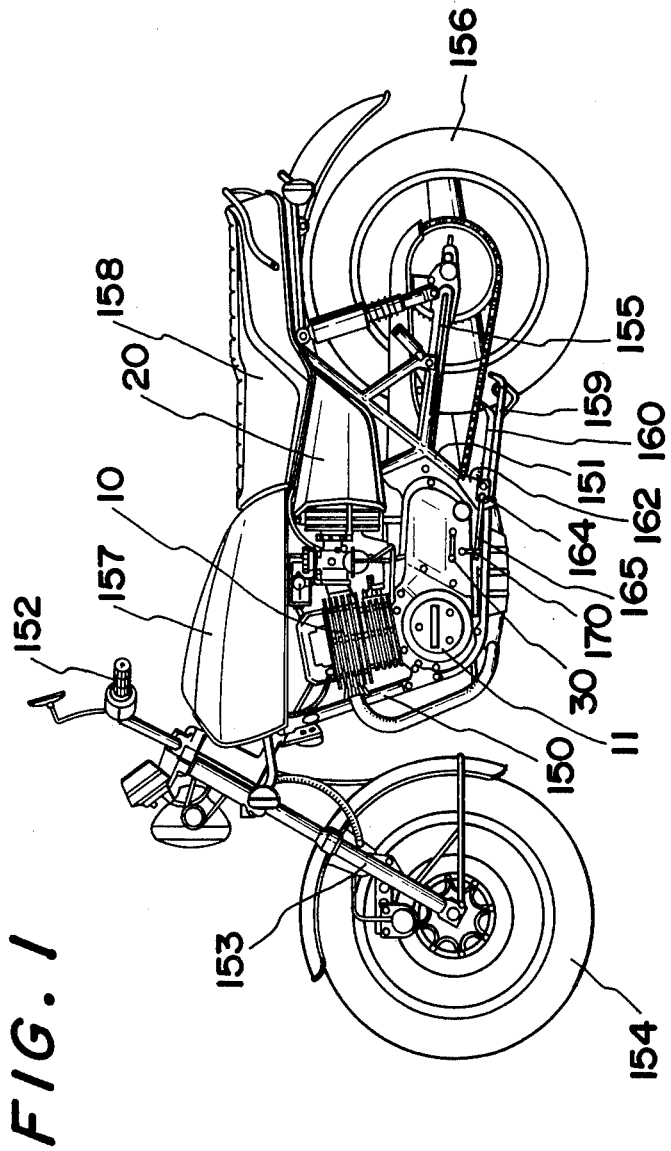
FIG. 1 is a side view of a motorcycle equipped with the device of the present invention.

FIG. 1 shows a schematic left side view of a motorcycle provided with a frame 150, a steering handle 152, a front fork 153 supporting a front wheel 154 and operated by handle 152, a rear wheel 156 supported by a rear fork 155, and a fuel tank 157 and seat 158 supported on frame 150.

Figure 4:
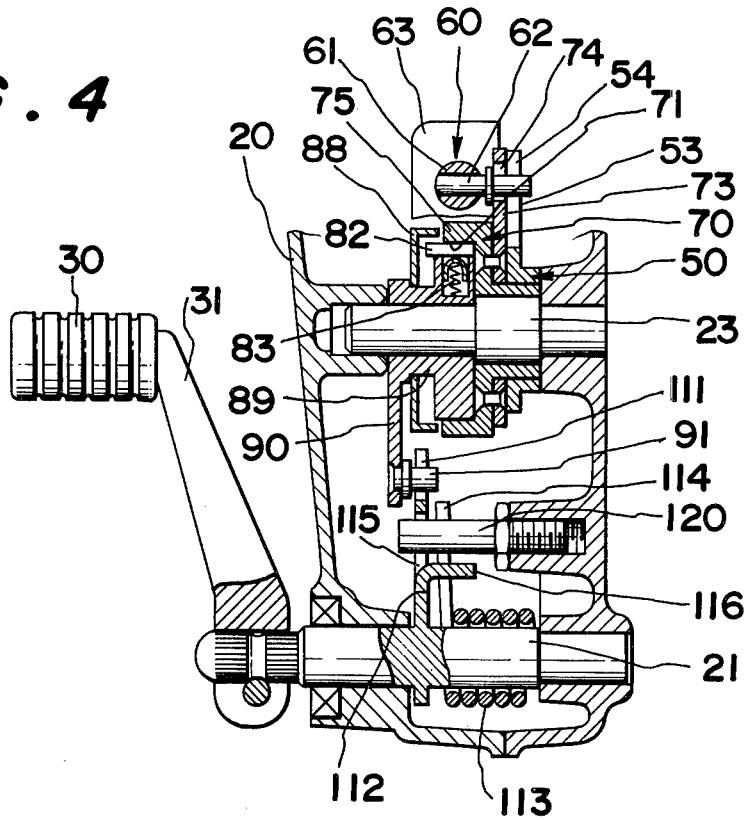
FIG. 4 is a sectioned view on line A-C in FIG. 2.

An engine 10 is mounted in the center of frame 150. A crank case 11 is provided just below the engine 10. A transmission case 20 of a fluid torque converter type automatic transmission gear is provided as continued behind crank case 11. A shift (change) pedal 30 is provided to project on the outside surface of transmission case 20, and is secured through a pedal arm 31 (FIG. 4) to the outward extended end of a shift shaft 21 (FIG. 4) provided within transmission case 20.

A main stand 159 and side stand 160 are provided on a frame pipe 151 behind transmission case 20, are both pivoted to frame pipe 151 so as to be free to rise and fall, and are selectively used in temporarily or continuously parking the autobicycle or motorcycle.

Figure 2:
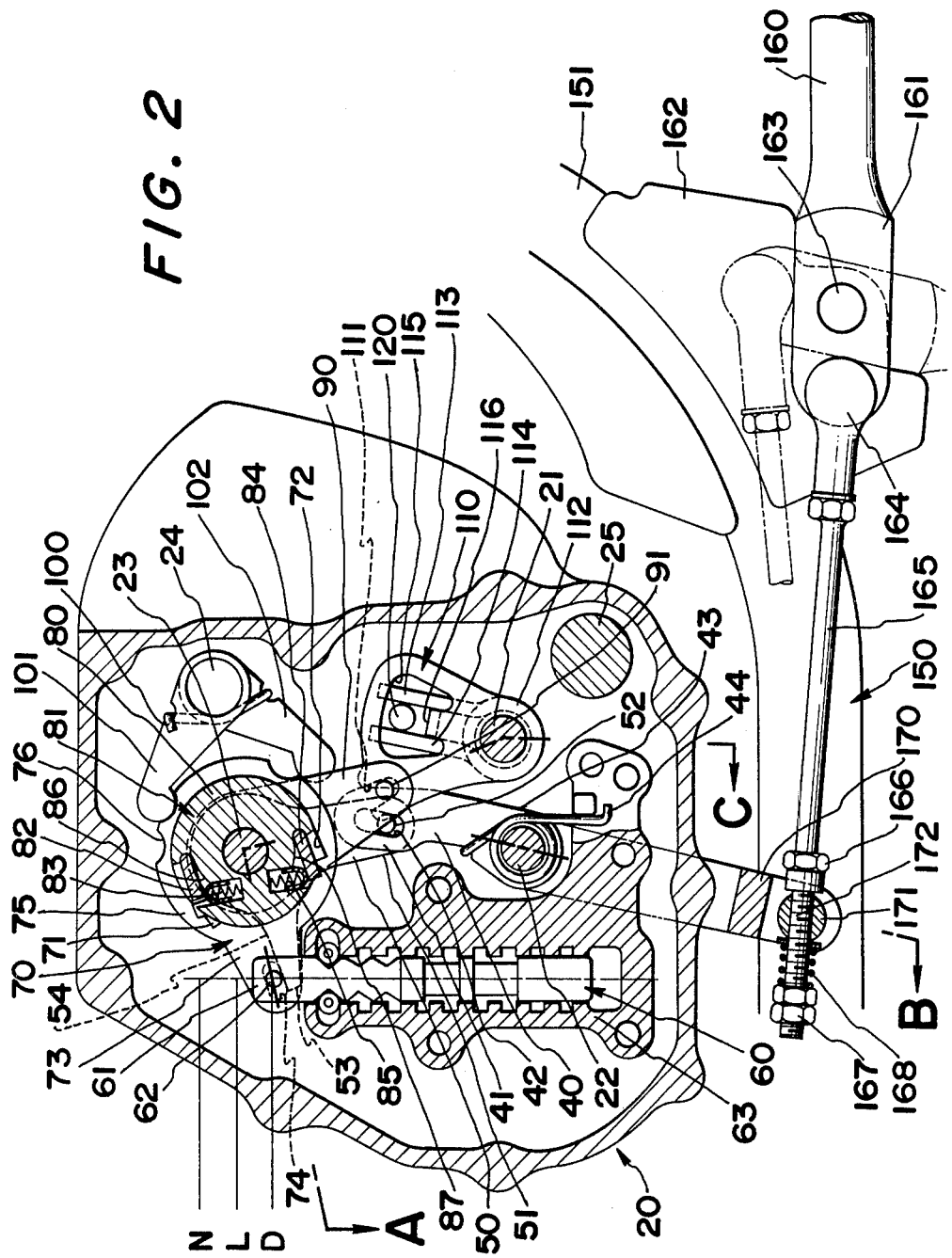
FIG. 2 is a side view of a stand and transmission case to show in detail an embodiment of the device of the present invention, the transmission case being in section and the stand being made to fall so that the shifting operation may be freely made.

Side stand 160 is fitted to frame pipe 151 as shown in FIG. 2, is forked in its base 161, is rotatably pivoted with a pin 163 to insert a bracket 162 suspended from frame pipe 151, and is formed to be free to rise and fall. Side stand 160 is connected in its base 161 with the base end of a rod 165 through a joint such as a ball joint, at the end of the pivoting part 163. The free end of rod 165 is connected with the free end of a connecting arm 170 through a universal joint 171. Arm 170 is extended at its free end out of transmission case 20, and is secured at its base end to an operating shaft 22 rotatably mounted within transmission case 20. Rod 165 is fitted in its free end in a through hole 172 made in universal joint 171. Stoppers 166 and 167 formed of nuts in the illustrated embodiment are provided in front and rear of joint 171 on the free end of rod 165, and are axially adjustable. A cushioning spring 168 is fitted between stopper 167 and joint 171.

A plate-shaped operating arm 40 is integrally secured in its base to operating shaft 22 within transmission case. A slot 42 is formed in the free end 41 of arm 40, and is engaged with a pin 52 provided in the suspended extension 51 of a neutral position holding regulating arm 50 rotatably supported on a supporting shaft 23 provided above an in parallel with operating shaft 22.

Operating arm 40 is engaged in its base 43 with one end of a return spring 44 engaged at the other end with the body fitting member or the like of the later described shift valve provided within transmission case 20 to resiliently rotate arm 40 clockwise in FIG. 2.

A manual shift valve 60, which is a speed changing operating member to change over a fed oil pressure to set the high and low clutches on and off to transmit the torque between the torque converter of the fluid torque converter type automatic transmission gear and an auxiliary shaft, is provided within transmission case 20 to slide axially within a valve body 63 to change over such oil pressure. Shift valve 60 is in the lower most position in FIG. 2 and is in a drive range D, a step above it is formed to be in a low range L, and a step further above it is formed to be in a neutral position N.

Neutral position holding regulating arm 50 is provided with a part 53 extending toward shift valve 60. Extension 53 comes below a pin 62 provided to project on an operating end 61 extended above valve body 63 of shift valve 60 so that the upper end sliding edge 54 of extension 53 may slide in contact with the lower surface of pin 62.

A shift outer member 70 and shift inner member 80 is rotatably mounted on supporting shaft 23 of neutral position holding regulating arm 50 by having shaft 23 in common.

Shift outer member 70 is fitted to the outer periphery of inner member 80 to be rotatable with respect to inner member 80, and is provided with a proper number of ratchet teeth 71 and 72 with the directions of the teeth respectively reversed in different positions at angular intervals on the inner periphery.

Figure 3:
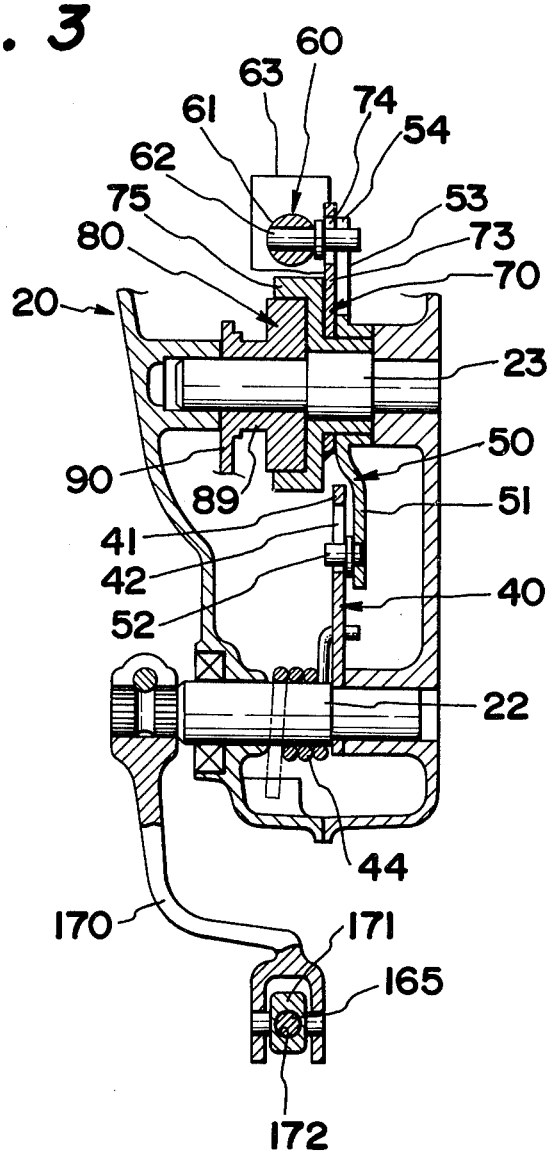
FIG. 3 is a sectioned view on line A-B in FIG. 2.

Shift outer member 70 is provided with an extension 73 extending toward operating end 61 of shift valve 60. A slot 74 is formed in extension 73 and is engaged with pin 62 provided in shift valve operating end part 61 (see FIGS. 3 and 4). Further, concave parts 76 are formed on the outer periphery of the body 75 of outer member 70 so that arms 101 and 102, resiliently pressed by a spring 100 to approach each other with a shaft 24 as a fulcrum to determine the shift position, may be engaged with concave parts 76 and the outer member 70 may be held in such shift position.

Pawls 82 and 84, opposed to the above mentioned ratchet teeth 71 and 72, respectively, are provided on the outer periphery of the body 81 of shift inner member 80 fitted to the inner periphery of shift outer member 70 and are housed respectively in concave parts 86 and 87 made in said parts of the outer periphery of body 81. The respective pawls 82 and 84 are resiliently pressed respectively by springs 83 and 85 so as to engage with the respective ratchet teeth 71 and 72. A cover 88 to prevent pawls 82 and 84 from springing out sidewise (axially) is provided on the side of body 81 of the inner member to also release pawls 82 and 84 in the fixed positions.

Shift inner member 80 is extended toward the front of shaft 23, that is, toward the side of transmission case 20.

A downward suspended extension 90 is integrally formed on extension boss part 89. A pin 91 is provided to project on extension 90 and is engaged with a U-shaped groove 111 formed at the free end of a shift arm 110 operated by the shift pedal provided outside.

Shift arm 110 is connected in its base part 112 integrally with the part located within transmission case 20 of shift pedal shaft 21 operated by shift pedal 30. Shift arm 110 is locked by a spring 113 arranged so as to insert a regulating pin 120 provided in parallel with shaft 21 within the transmission case, and resiliently regulates shaft 21 including shift arm 110 and shift pedal 30. A window 115 is made in the center of shift arm 110 and is bent and extended on the lower side toward pin 120. The extended piece 116 is inserted between the free ends 114 of spring 113. Pin 120 is freely fitted at the free end in window 115 by keeping a sufficient clearance. In the drawing, 25 designates a shaft of a kick starter.

The operation of the present invention is explained in the following. In the state shown in FIG. 2, shift valve 60 is in its lowermost position, the high speed drive range D, and can be slid upwardly to be changed over by a step above to the low speed range L, and by a further step above to the neutral position N.

When side stand 160 is rotated with pin 163 as a fulcrum as shown by the phantom lines in the state shown in FIG. 2, the rod 165 and arm 170 will be pulled rightwardly in the drawing, the operating shaft 22 will then rotate counterclockwise in the drawing and operating arm 40 connected with it will also rotate in the same direction.

Therefore, holding arm 50 engaged with operating arm 40 through pin 52 and slot 42 will rotate clockwise in the drawing with supporting shaft 23 as a center. As a result, extension 53 in the free end of holding arm 50 will rotate and rise and shift valve 60 related in contact with sliding edge 54 on the upper end of extension 53 will be forcibly slid to rise to the neutral position N in the uppermost position.

In such case, as slot 74 in extension 73 is engaged with pin 62 of shift valve 60, the shift outer member 70 will be forcibly lifted and rotated with the rise of shift valve 60. With the rotation of shift outer member 70 clockwise as shown in the drawing, the ratchet tooth 71 engaging in the rotating direction and the pawl 82 of shift inner member 80 will engage with each other so that inner member 80 may also rotate in the same direction. At the time of the operation, as the other pawl 84 and ratchet tooth 72 are in the escaping direction, the inner member 80 will rotate without interference.

With such rotation of inner member 80, the shift arm 110 engaged in groove 111 with pin 91 of extension 90 will rotate counterclockwise against spring 113 integrally with the shaft 21 and will return to the neutral position of the shift pedal 30 provided on the end of shaft 21 extending out of transmission case 20.

With the rise of side stand 160, the shift valve 60 will be directly slid through the link mechanism and will be forcibly set in the neutral position. With the contact of pin 62 and holding arm 40 with each other, when the stand rises, the neutral position will be held so that the lowering motion of shift valve 60, i.e., the shift of shift valve 60 down to the low range and drive range positions may be regulated. Together with the foregoing operation, the shift valve will be automatically returned to the neutral position by operating the shift operating mechanism connected with shift pedal 30 and operated manually (by foot treading), the shift operating mechanism connected with the shift pedal 30 will be held in the neutral position by the above-mentioned operation of holding arm 40, and in this state, even if shift pedal 30 is to be shifted up to shift down shift valve 60, the shift valve will be locked so as not to be able to be shifted down. In this state, pedal 30 will be able to rotate in the range allowable by spring 113 within the clearance of window 115 in shift arm 110 connected with shaft 21. Even if pedal 30 moves, the shifting operation will not be effected.

Figure 5:
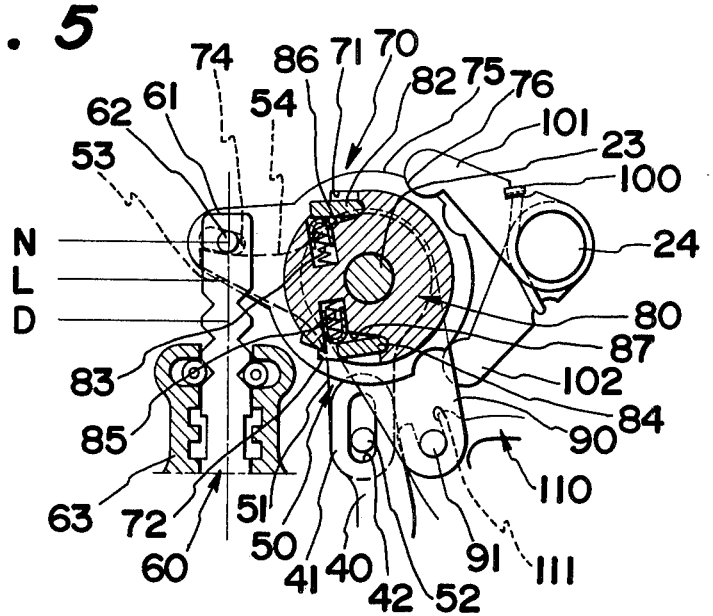
FIG. 5 is a view showing only the essential part of FIG. 2 as the stand is made to rise and the speed changing operating member is returned to the neutral position.

The relations of holding part 40, shift outer member 70, shift inner member 80 and shift valve 60 in the neutral position are shown in FIG. 5.

When side stand 160 is made to fall as in FIG. 2, the rod 165, arm 170, operating shaft 22, operating arm 40, and holding arm 50 will operate reversely to the above description and, with the counterclockwise rotation of the holding arm 50, the extension 53 will lower to the lowermost drive range position D. Because extension 53 and pin 62 of shift valve 60 are merely in contact instead of being engaged with each other, the shifting operating motion, i.e., the vertical motion of the shift valve 60, will not be obstructed. Therefore, shift valve 60 can be moved freely up and down through the shifting operating mechanism connected with shift pedal 30 by the shifting up operation of shift pedal 30, and the speed changing operation to the neutral N, low range L, and drive range D positions can be made smoothly.

The operation of shift pedal 30 in the above embodiment will be transmitted to outer member 70 by shift pedal shaft 21, shift arm 110, engagement of its groove 111 with pin 91 in extension 90 of inner member 80 and engagement of pawl 82 or 84 with ratchet tooth 71 or 72 and will shift the shift valve 60 engaged with outer member 70 through pin 62.

The above embodiment has been explained as applied to a fluid torque converter type automatic transmission gear, but the present invention can be applied also to a mechanical transmission gear. In such case, the shift drum which is a speed changing operating member may be directly regulated by a link mechanism or the like so that, when the stand rises, the shift drum may be rotated to be set in the neutral position. Further, in the illustrated embodiment, the rod is provided as a member connecting the link with the stand. However, a wire member or the like may be used instead of the rod.

We claim:

1. A speed changing position regulating device for a motorcycle having a transmission gear, comprising:
   a shift pedal (30);
   a link mechanism (40, 50, 80, 100);
   connecting means (165, 170);
   a stand (160) pivotally connected to the frame of said motorcycle;
   a speed changing operating means (60) for the transmission gear for changing over speed changing positions by the operation of said shift pedal (30) which is operatively connected with said speed changing operating means (60);
   said link mechanism (40, 50, 80, 110) being operated through said connecting means (165, 170) by the rise and fall of said stand (160) so that, when said stand (160) rises, the shift position of said speed changing operating means (60) may be changed over to a neutral position by said link mechanism (40, 50, 80, 110) operated by said connecting means (165, 170) and said speed changing operating means (60) may be held in said neutral position.

2. A device according to claim 1 wherein said link mechanism (40, 50, 80, 110) comprises:
- a regulating means (50) connected with an operating member (40) operatively connected at one end thereof with said speed changing operating means (60) and operatively connected at the other end thereof with the rise and fall of said stand (160) so that, when said stand (160) rises, said speed changing operating means (60) may be set and held in said neutral position; and
- an operating means (80) operatively connected with said shift pedal (30) connected at one end thereof with said speed changing operating means (60) and at the other end thereof with a shifting member (110) operated by said shift pedal (30) so that, when said stand (160) rises, said speed changing operating means (60) may be held in said neutral position by said regulating means (50), and said operating means (80) operatively connected with said shift pedal (30) may be locked.

3. A device according to claim 1, wherein said means for connecting said link mechanism with said stand comprises:
- a universal joint provided at the upper end of said stand;
- an intermediate operating connecting member connected to one end of said link mechanism; and
- a connecting member connecting said universal joint and said intermediate operating connecting member so that, when said stand rises, said connecting members may be operated and said link mechanism may be operated to set said speed changing operating means in said neutral position.

4. A speed changing position regulating device for a motorcycle equipped with a fluid type automatic transmission gear, comprising:
- a stand (160) pivoted to the body of said motorcycle to be free to rise and fall;
- a shift pedal (30);
- connection means (165, 170);
- a manual shift valve (60) for said fluid type automatic transmission gear for changing over the speed change positions by the operation of said shift pedal (30) which is operatively connected with said shift valve (60); and
- a link mechanism (40, 50, 80, 110) operated through said connecting means (165, 170) by the rise and fall of said stand (160) and connected with said shift valve (60) so that, when said stand (160) rises, the shift position of said shift valve (60) may be changed over to a neutral position by said link mechanism (40, 50, 80, 110) operated by said connecting means (165, 170) and said shift valve (60) may be held in said neutral position.

5. A device according to claim 4, wherein said link mechanism comprises:
- regulating means operatively connected with said stand including a rotatable neutral position holding regulating member connected at one end thereof with the operating end of said shift valve;
- a holding member connected at one end thereof with the other end of said regulating member and operated with the rise and fall of said stand; and
- shifting means for selectively changing over by a manual operation the shifting positions of said shift valve including a rotatable shifting member connected with a shifting operating member operated as connected at one end thereof with the operating end of said shift valve and operatively connected at the other end thereof with said shift pedal so that said regulating means may be operated with the rise of said stand, said shift valve may be held in said neutral position by said regulating member connected with the operating end of said shift valve, said shifting member of said shifting means may be operatively connected with said shift valve, and said shifting operating member and shift pedal may be set and held in said neutral position.

6. A device according to claim 5, wherein said link mechanism includes:
- a rotatably borne regulating arm connected at one end thereof with said operating end of said shift valve;
- a holding arm engaged and connected at one end thereof with the other end of said regulating arm;
- an operating shaft rotating and operating said holding arm and rotating as operatively connected with the rise and fall of said stand; and
- a manual shift means comprising a shift outer member borne in common with said regulating arm and engaged and connected at one end thereof with said operating end of said shift valve, and a shift inner member borne in common with said shift outer member and engaged by selecting the rotating direction of said member and a shifting operating member engaged and connected with one end of said inner member and operated as operatively connected with said shift pedal.

7. A device according to claim 4, including:
- a universal joint provided at the upper end of said stand free to rise and fall;
- an operating member connected with means for holding and regulating said shift valve of said link mechanism in said neutral position; and
- a connecting member connecting said member and universal joint and operatively connecting said operating member with the rise and fall of said stand.

* * * * *